W. ECKFORD.
BULLET MAKING MACHINERY.
APPLICATION FILED FEB. 19, 1918.
1,330,853.
Patented Feb. 17, 1920.
6 SHEETS—SHEET 5.
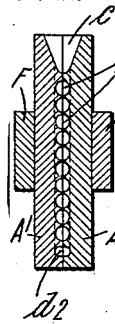
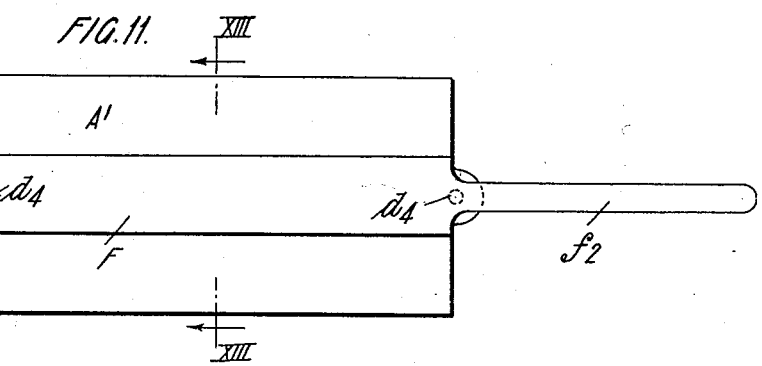
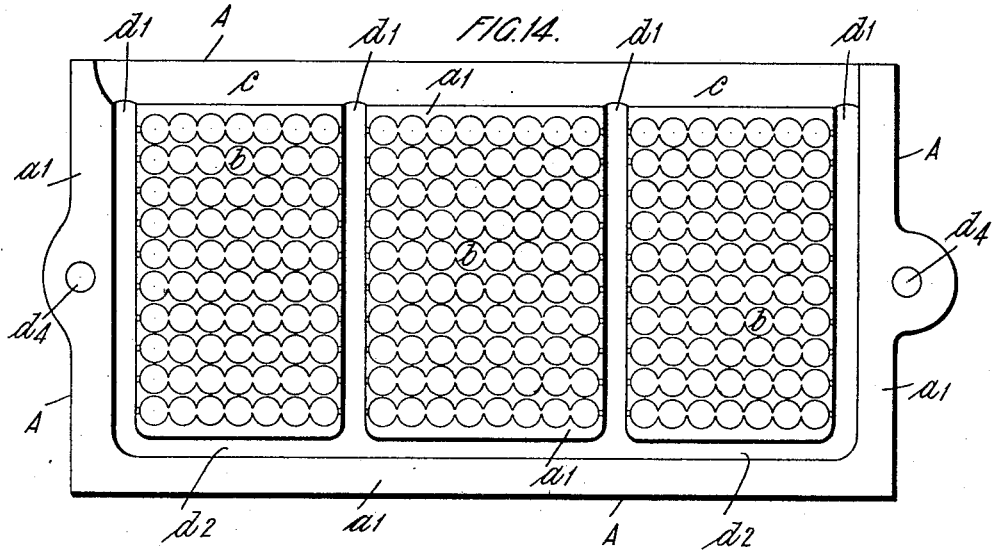
Inventor:
William Eckford,

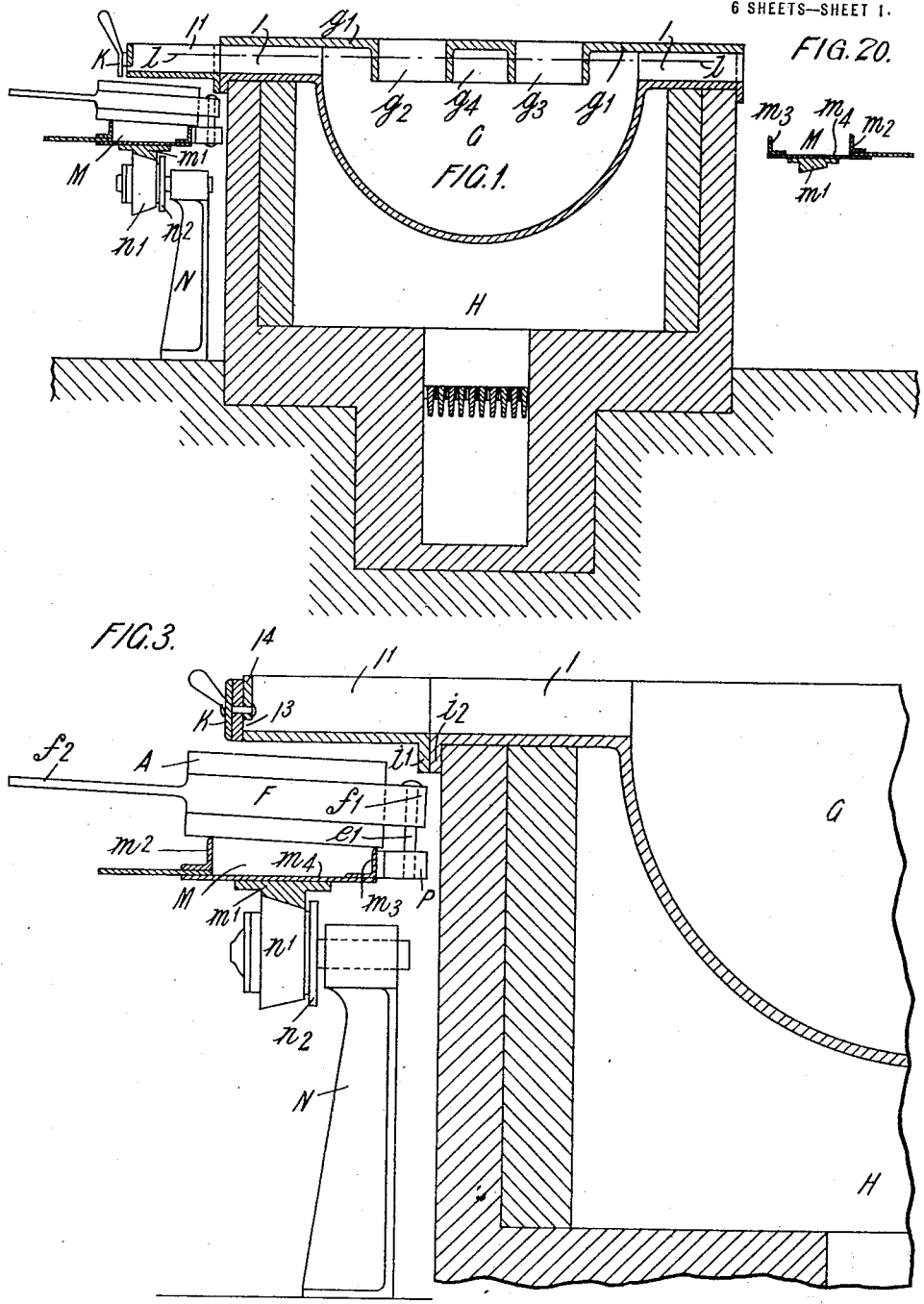

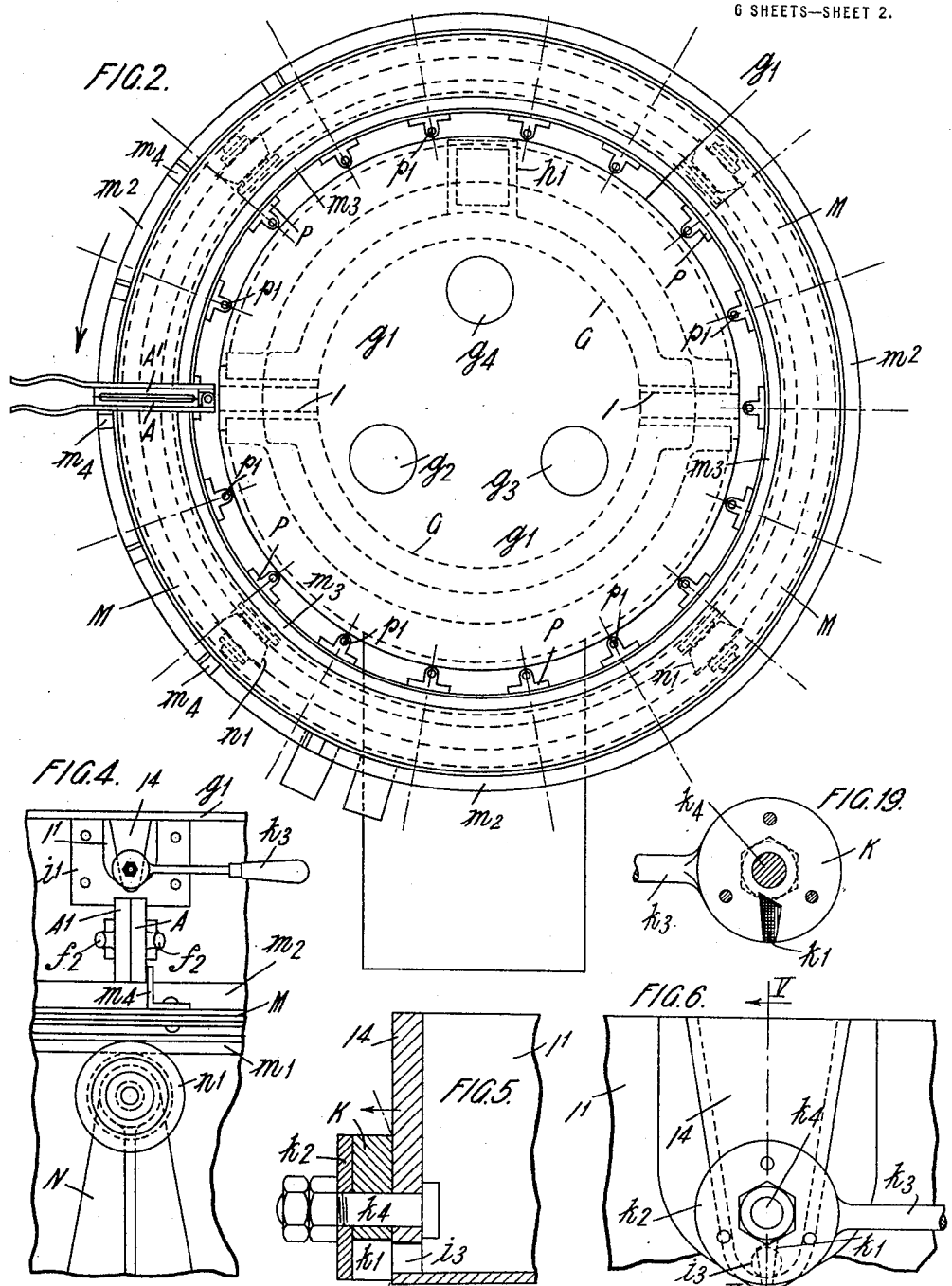

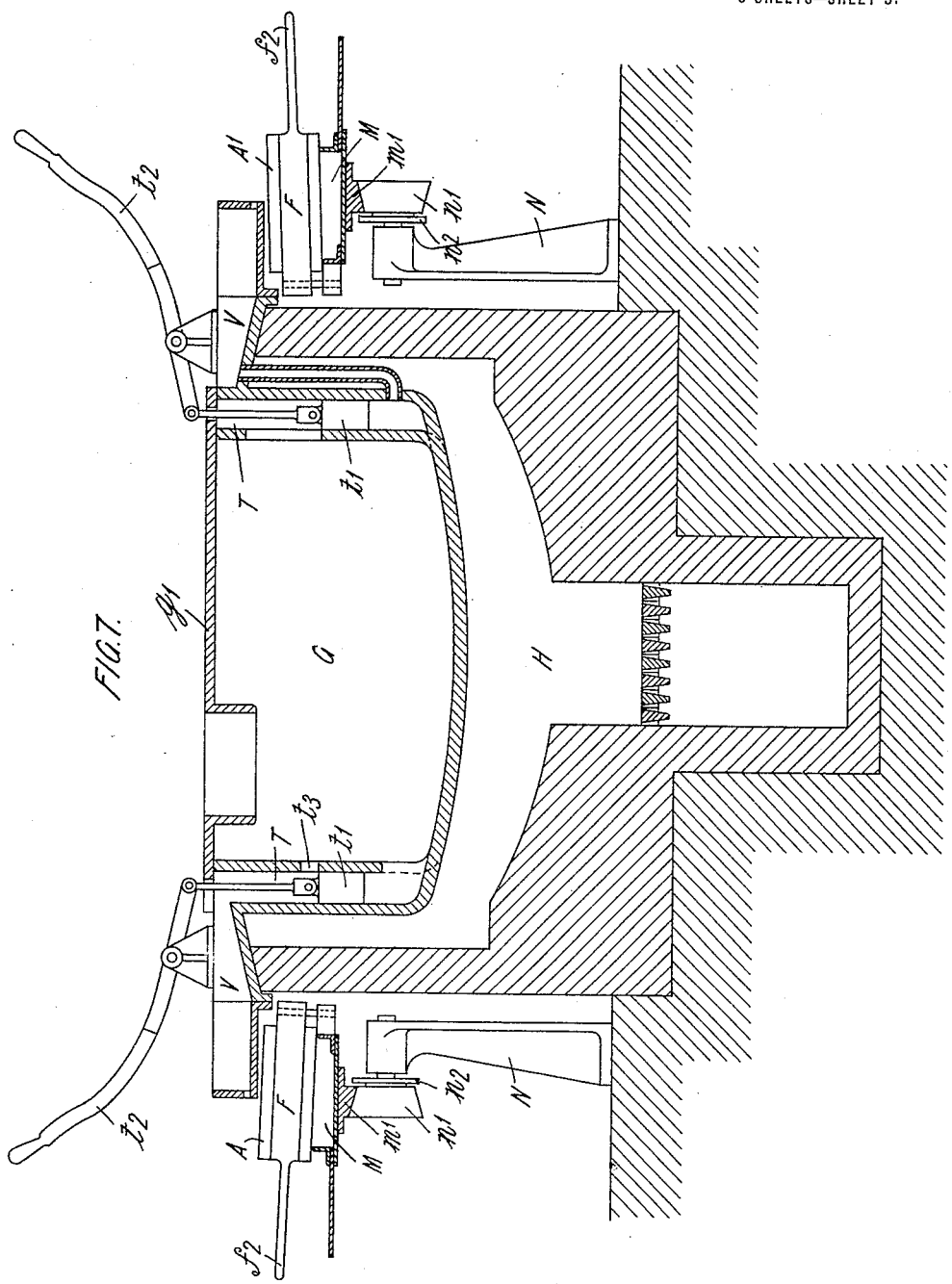

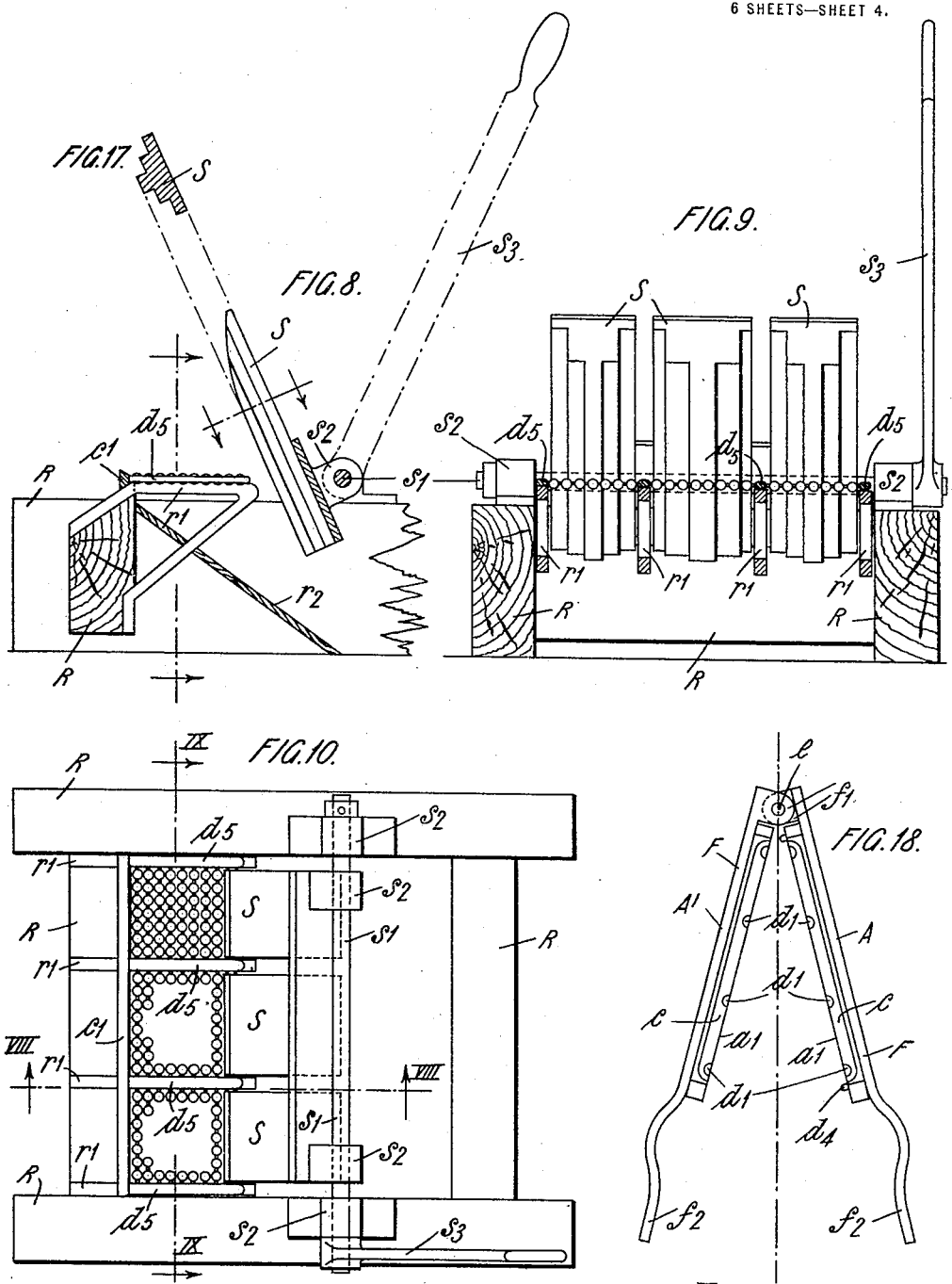

W. ECKFORD.
BULLET MAKING MACHINERY.
APPLICATION FILED FEB. 19, 1918.

1,330,853.

Patented Feb. 17, 1920.
6 SHEETS—SHEET 6.

Inventor:
William Eckford,
by Spear, Middleton, Donaldson & Spear,
Attys.

UNITED STATES PATENT OFFICE.

WILLIAM ECKFORD, OF RHYL, WALES.

BULLET-MAKING MACHINERY.

1,330,853.  Specification of Letters Patent.  Patented Feb. 17, 1920.

Application filed February 19, 1918. Serial No. 218,145.

*To all whom it may concern:*

Be it known that I, WILLIAM ECKFORD, a subject of the King of Great Britain, and residing in Rhyl, in the county of Flint, Wales, have invented certain new and useful Improvements in Bullet-Making Machinery, of which the following is a specification.

This invention relates to bullet making machinery such as shown in a copending application #218,146 and is specially applicable to machines for making shrapnel bullets, and the object is to provide a machine in which with a minimum of labor a large number of multiple molds may, in succession, be charged with molten metal from a common melting pot and from which molds the cast of bullets may be withdrawn and afterward be separated from the surplus metal which is then returned to the melting pot.

The invention as applied to machinery for making lead-alloy shrapnel bullets is illustrated in the accompanying drawings, in which:—

Figure 1 is an elevation, in medial section, of the bullet molding apparatus.

Fig. 2 is a corresponding plan.

Fig. 3 is an elevation in medial section of a part of Fig. 1 drawn to a larger scale.

Fig. 4 is a corresponding part front elevation also to a larger scale.

Fig. 5 is a side elevation in section on the line V, V, of Fig. 6 of the spout and valve for controlling the flow of molten metal to the molds.

Fig. 6 is a corresponding front elevation of the valve and spout.

Fig. 7 is a view of a modification in which the molten metal is delivered to the molds by means of a pump.

Fig. 8 is an end elevation in section on the line, VIII, VIII of Fig. 10 of the means for separating the bullets from the surplus metal.

Fig. 9 is a corresponding front elevation in section on the line IX, IX of Fig. 10.

Fig. 10 is a corresponding plan view.

Fig. 11 is an elevation of one of the multiple bullet molds.

Fig. 12 is a corresponding plan.

Fig. 13 is an elevation in transverse section on the line XIII, XIII of Fig. 11.

Fig. 14 is a face view of one of the two mold plates.

Figs. 17, 18, 19 and 20 are views of details.

Figure 15:
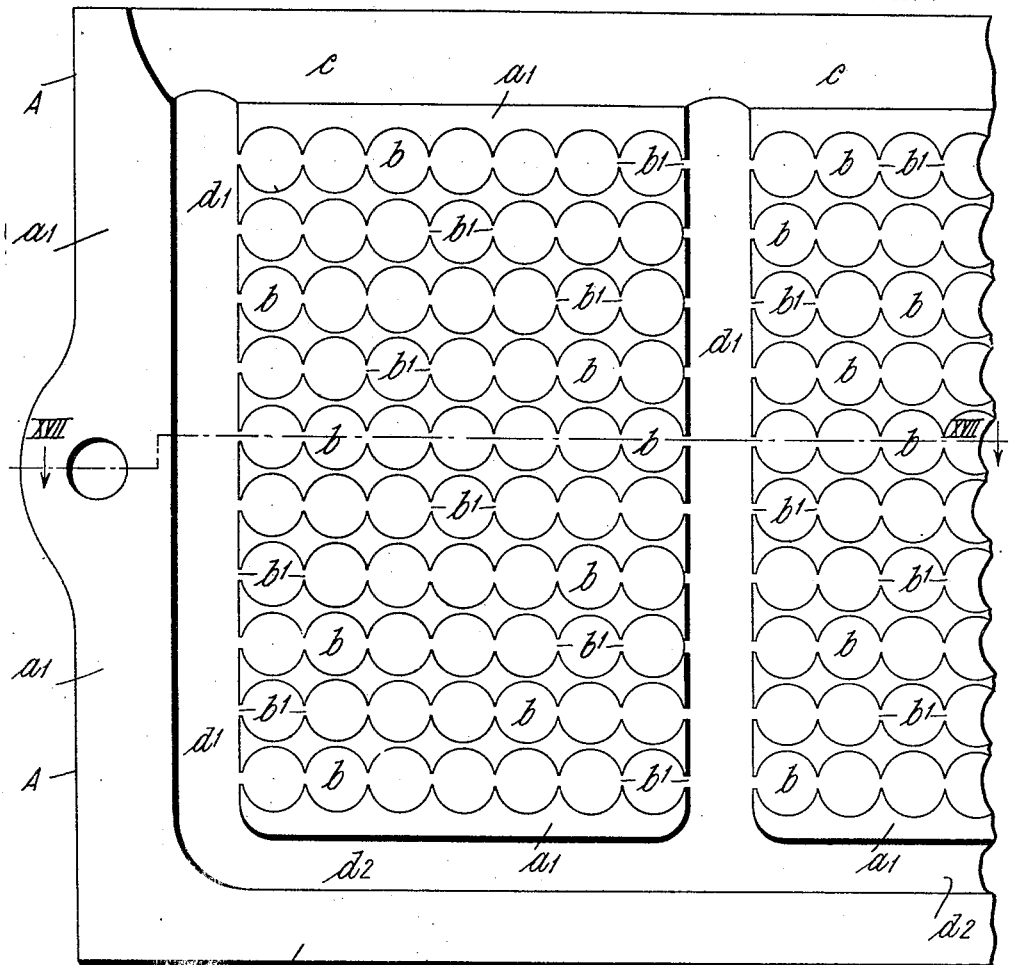
Fig. 15 is a part face view to a larger scale.
Figure 16:
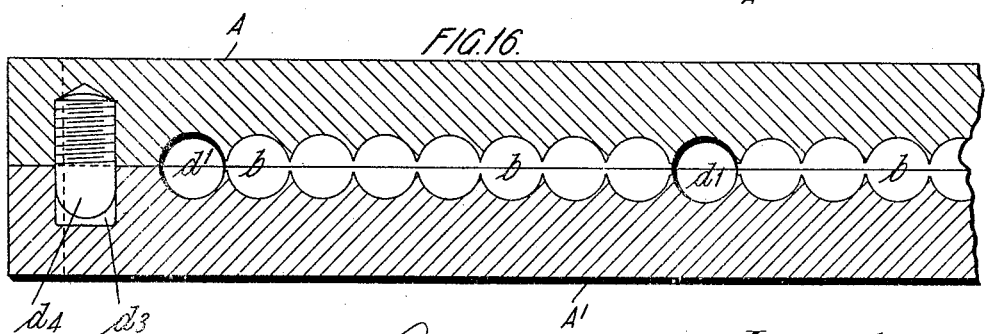
Fig. 16 is a corresponding part longitudinal section on the line XVI, XVI of Fig. 15.

The lead melting pot G is set on a suitable furnace H and flues $h^1$. The pot is fitted with a cover $g^1$ having openings $g^2$, $g^3$ and $g^4$; metal is fed to the pot G through the opening $g^2$, and surplus metal which fills the gets and channels in a cast of bullets is fed in through the opening $g^3$. In the opening $g^4$ I insert a pyrometer. The pot is fed with metal so as to maintain the level $l$, $l$ of molten metal just below the cover in order to prevent the formation of dross by the access of air.

The trough is fitted with one or more, preferably with two, troughs or channels I which lead the molten metal to an extension trough I' the flange $i^1$ of which is attached to the flange $i^2$ cast on the trough I; the extension trough I' is fitted with a combined valve and spout K.

The molds A, A', of which a comparatively large number are fitted—in the arrangement illustrated provision is made for eighteen, but more or fewer may be used—are carried on an annular table M having a coned race $m^1$ supported on a series of conical rollers $n^1$ carried by the brackets N. The rollers $n^1$ are mounted in any suitable manner such as by ball bearings or other antifriction devices so that the table can be rotated easily by hand; the table is self-centering on the cone surfaces, but its displacement is limited by the flanges $n^2$ carried by the coned rollers $n^1$. The table is formed of two circular angle-iron rings $m^2$ and $m^3$ connected by the part $m^4$, on which the coned race $m^1$ is mounted. The angle-iron ring $m^2$ of the table M is higher than the angle-iron ring $m^3$, which causes the molds which are placed therein to slightly incline.

The multiple molds are each constructed as follows:—

A and A' are two side plates or cheeks the inner faces $a^1$ of which are recessed as herein described to form the bullet molds $b$, the pouring trough $c$ and the channels or ducts $d'$ leading to the molds. The two plates are hinged together by a hinge pin $e^1$, the axis of which is in the plane of the abutting faces $a^1$; the hinge pin pivotally connects the two lugs $f^1$ formed respectively at the one end of the narrow plates F, the other ends of which narrow plates are extended in the form of handles $f^2$ by means of which the mold is opened and closed in the operation of bullet making. In order to insure proper alinement of the two plates when closed, the one A is fitted with dowel pins $d^4$ which fit accurately in the corresponding holes $d^3$ in the other half A'.

The respective bullet molds are formed by oppositely located hemi-spherical recesses $b$, the one set in the part A and the other set in the part A'. There are several vertically disposed rows of these recesses, say ten; and the recesses or molds in the respective rows are grouped in sets; in the example illustrated in Fig. 14 there are three groups each located between two feeding channels $d'$. Each set in each row is fed from each end; the hemi-spheres in a set are connected with each other and with the channels $d'$ by small passage-ways $b^1$ of V-shape in cross-section, and these, when the mold is closed, form short passage-ways, by which the molten metal flows from the channels $d'$ to the molds $b$ and from mold to mold. The cross-section of these passage-ways, which are filled with metal when the cast is completed, is made as small as is consistent with the proper flow of metal; the metal parts filling the passageways are technically known as "gets", or gates, and the smaller they are the more readily the bullets separate, and the more easily and perfectly the bullets are stripped off the gets and assume the truly spherical shape.

It is of importance, therefore, to reduce the size of the gets to within reasonable limits, and the grouping of the molds and the provision of end and intermediate channels to feed them permits of this reduction. The spherical recesses are usually drilled out so that the great circles of the groups of hemi-spheres, which lie on the faces $a^1$ of the mold are just out of contact, being separated just sufficiently to form a thin partition wall in which the passage-way is formed. The channels are usually of circular cross-section and are formed half in each part of the mold plate; they communicate at their upper ends with a pouring trough $c$ into which the metal is poured from a ladle, or from the spout or tap of a lead-melting pot when the multiple molds are used in connection with a bullet making machine. The vertical channels $d^1$ are connected together by a bottom channel or duct $d^2$.

When the metal is poured into the closed mold it passes first to the bottom of the channels $d^1$ and along the bottom duct $d^2$, thence to the respective groups of molds of the lower row of molds, thus filling the molds in succession from the bottom, which is a matter of considerable importance as affecting a sound cast, inasmuch as it insures the free escape of the air and therefore the absence of blow-holes, and the production of a solid cast. When the mold has cooled and the metal has set, the mold is opened and the cast is removed, the metal which filled the pouring trough and the channels serving, with the "gets", to hold the bullets together during their removal from the mold plates, which is thus accomplished with facility, and the separation of the bullets is effected afterward as and when desired.

The hinge pins $e^1$ of the series of molds are adapted respectively to fit holes $p^1$ in brackets P attached to the ring $m^3$ and equally spaced around the circumference. The molds are thus located in position on the rotating table, but as the connection is pivotal the molds can be angularly adjusted in one direction, as they come under the spout, so that the pouring trough $c$ can be brought exactly under the spout. Stops $m^4$ limit the angular movement of the mold relatively to the table in the direction in which the table is turning, so that the handles $f^2$ may be used to rotate the table.

The pouring arrangements are as follows:

The troughs I and I' are filled with the molten metal to the level $l, l$, and the end wall $i^4$ of I' has an outlet $i^3$ shaped as shown; this outlet is normally covered by a valve disk K pivotally carried from the wall $i^4$ by the pins $k^4$; the disk K has a port $k^1$, and the outer face of the disk is covered by the handle plate $k^2$ of a handle $k^3$, the plate being bolted to the disk K; when the disk is turned so that the port $k^1$ is opposite the outlet $i^3$ the covered port forms a spout which guides a stream of the molten metal downwardly, and directs it into the pouring trough $c$ of the mold which at the time is immediately under the spout. When a mold is filled the operator using the mold handles as a lever turns the table in the direction of the arrow till the pouring trough of the next mold is under the spout $k^1$.

Preferably the attendant over-runs the correct position slightly and obtains the final close adjustment by angling the mold about the pin $e^1$ in the rearward direction until the pouring trough $c$ is immediately under the spout. There would, for the machine illustrated, be two attendants for pouring, one opposite each spout, and two attendants for emptying the molds; each of the latter, in order to give as long an interval as possible for the molds to cool and the metal to set, would be located about half a circumference in advance of the point at which the molds they are handling are being filled, and two diametrally opposite molds are filled and two diametrally opposite molds are emptied at the same time, and while the table is stationary.

The casts when removed from the molds are preferably transferred to the device illustrated in Figs. 8, 9 and 10 in which the bullets are separated from the surplus metal which filled the channels of the mold.

The device comprises a frame R which carries four bars or brackets $r^1$, which are so spaced that when the cast is laid on the bars the solid metal parts $c^1$ and $d^5$ corresponding with the pouring trough $c$ and channels $d^1$ are supported by the bars $r$ and frame R, the bullets being unsupported. On a shaft $s^1$ carried in bearings $s^2$ and operated by a handle $s^3$ are fixed a number— three in the arrangement illustrated—of arms S spaced so as to pass between the bars $r^1$ as the shaft is turned through the necessary angle. The centers of the bearings $s^2$ are so located in relation to the bars $r$, that the arms S engage with the rows of bullets in succession and shear them off. The faces of the arms S may be rounded or stepped so as to engage first the bullets in the successive rows which are centrally located between the bars $r^1$; the bullets pass down a chute $r^2$ from which they are transferred in any convenient manner to the usual type of devices employed to remove the "gets" and to gage the bullets.

The means for transferring the molten metal from the melting pot to the molds instead of being a valve controlled spout may be a pump device as shown in Fig. 7.

T is a pump barrel immersed in the molten metal and having a piston or plunger $t^1$, operated by a handle $t^2$; $t^3$ is a port in the wall of the barrel through which the molten metal passes into the pump barrel. If on the down stroke the plunger be lowered till its top is below the port the next up-stroke will raise the metal above the plunger through the spout V to the pouring trough of the mold.

Having fully described my invention, I declare that what I claim and desire to secure by Letters Patent is:—

1. In machinery for bullet making, in combination, a melting pot, a series of multiple molds, a rotatable table to carry said molds and adapted by its movement to bring them in succession into position for charging, said table surrounding the melting pot, means central of and below the table for heating the melting pot, and means for transferring the molten metal from said melting pot to the mold in charging position, substantially as described.

2. In a bullet making machine, a melting pot, a series of multiple molds, an outlet trough from the melting pot to the molds, and a valve controlling said outlet, said valve being constructed in the form of a disk pivoted on the end of the trough, and provided with a port extending inwardly from the rim and the end of which is closed, substantially as described.

3. The valve of claim 2 in which the port is adapted to form a downwardly directing spout, substantially as described.

4. In a bullet making machine, a melting pot, means for heating it, a series of multiple molds, a rotatable table adapted to carry said molds and adapted by its movement to bring them in succession into position for charging, and means for transferring the molten metal from the melting pot to the molds, said molds being pivoted to the table in such a manner that when the table is stopped with a mold under the discharge outlet of the melting pot it may be moved horizontally in either direction to properly aline the discharge outlet with the inlet to the molds.

5. In a bullet making machine as claimed in the preceding claims, and in combination with the elements therein set forth, two angle bars shaped to circles of different diameters, and adapted to form the frame of the rotating table on which the molds are supported, one angle bar being higher than the other so that when the mold is placed thereon it is given a slight inclination, substantially as described.

In witness whereof I set my hand in presence of witnesses.

W. ECKFORD.

Witnesses:
J. E. LLOYD BARNES,
JOSEPH E. HIRST.